3,337,988
TRELLIS
Charles G. Burton, Lewiston, N.Y., assignor to Chisholm-Ryder Company, Inc., Niagara Falls, N.Y., a corporation of New York
Filed Apr. 22, 1965, Ser. No. 450,013
2 Claims. (Cl. 47—46)

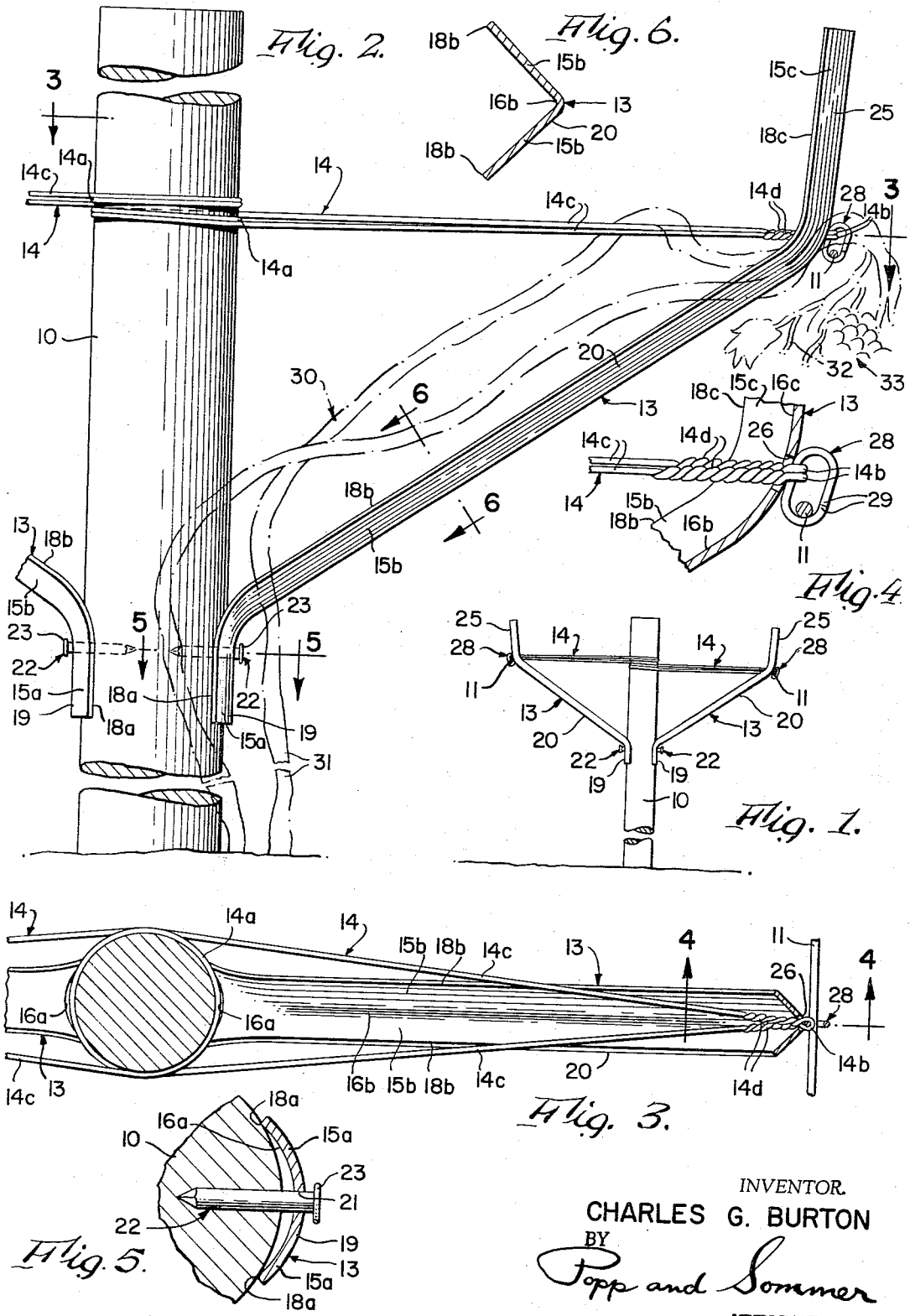

ABSTRACT OF THE DISCLOSURE

Machine harvesting of grapes with the harvester of my copending application Ser. No. 449,974, filed Apr. 22, 1965, requires a cantilevered main longitudinal trellis wire which is reciprocated upwardly from its normal operative position to displace and shake the grapes from the vines. Applicant accomplishes this by rigid metal arms each having a vertical downward extension at its inboard end alongside its post and fastened thereto by a horiontal headed nail or the like, the arm extending upwardly and outwardly and having its outboard end connected both to the main longitudinal trellis wire and to a horizontal flexible grape post wire looped around the top of its post. The invention resides in arranging the head of each nail in spaced relation to the vertical downward extension of its rigid arm so that the arm's outboard end can be freely reciprocated upwardly from its normal position to which position the arm returns, due to the weight of the supported vines, when the harvester has passed.

---

In the use of such a grape harvester it is necessary that the grape vines be supported by a trellis so constructed, and the vines so trained, that the bunches of fruit hang down from a curtain of canes supported by a generally horizontal, longitudinal trellis wire over an unobstructed space.

To this end the grape posts of an existing vineyard must be modified to permit of so training the vines. In such existing vineyard, the existing wooden grape posts are of round or rectangular form in cross section, usually being from 3½ to 5 inches in maximum cross section, and they are spaced from one another to accommodate several vines in the space between each pair of posts. The vines are planted away from the posts to facilitate vineyard cultivation and to permit post replacement without disturbing the roots of the vines.

In so converting an existing vineyard to mechanically harvesting grapes from such a hanging curtain of fruit bearing canes, it has heretofore been proposed to fasten a horizontal or diagonal wooden cross arm to extend outwardly from the post near the top thereof and to fasten a supporting wire extending from the top of the post to the outboard end of the wooden cross arm. A main longitudinal trellis wire was then strung along the outboard ends of the wooden cross arms of each row so that this wire was in horiontally spaced relation alongside its row of posts to permit of supporting a freely supported curtain of fruit bearing canes. The trunks of the vines were trained vertically and then horizontally to this main longitudinally trellis wire and their canes trained along this wire to form the required freely supported curtain of vines.

Such trellises with wooden cross arms have the advantage of low cost of materials, but are time consuming to erect, can be insecure depending on the care and skill applied in erecting them, are subject to breakage during machine harvesting of grapes, also have a limited life span, and are usually completely covered by the vines so that they cannot be seen by the operator of the mechanical harvester.

The principal object of the present invention is to provide a trellis having a metal cross arm which has a far greater useful life than the wooden cross armed trellis above described but which at the same time is competitive in cost of materials with the wooden cross armed trellises heretofore used.

Another object of the invention is to provide such a trellis in which the metal cross arm will support a heavy weight of fruit bearing canes while at the same time it will swing upwardly upon being contacted at its outboard end by the mechanical grape harvester, instead of breaking.

Another object is to provide such a metal cross arm which is so formed that, with the mechanical grape picker of my said copending application, it has a cam or glancing engagement with the shaker arms and cam protector plate of the harvester thereby to avoid destructive direct blows against the trellis cross arm.

Another object is to provide such a metal cross arm which is moved upwardly out of the way and without damage when the mechanical harvester is steered too close to the row of grape posts Another object of the present invention is to provide such a trellis in which end cross arm has a stable, but yielding, mounting on its grape post to withstand horizontal forces against the arm lengthwise of the row without becoming displaced on the grape post.

Another object of the invention is to provide such a trellis having a metal cross arm which assists the driver of the mechanical grape harvester in maintaining proper alinement and positioning with reference to the row of grapes he is harvesting. This is achieved by providing an upward continuation of the outboard end of each trellis cross arm which ends project above the curtain of fruit bearing canes and is visible to the driver. As described in detail in my said copending application, the grape harvester can be provided with a member, such as a frame post, which is sighted along these visible upwardly projecting arm ends so as to facilitate accurate steering of the harvester along the row of grape vines.

Another important object of the present invention is to provide such a trellis in which the longitudinal trellis wire does not have to be threaded through any part at the outer end of each metal cross arm, but in which this trellis wire can be laid or uncoiled alongside each row of grape posts and then progressively lifted and attached to the cross arm of each grape post. This is accomplished by the provision of a split link at the outer end of each cross arm, the link having abutting ends which can be opened up to receive the longitudinal trellis wire following which the link can be closed.

Another object of the present invention is to provide such a trellis in which the transverse arm supporting wire between the top of each grape post and the outboard end of its cross arm is securely attached to the outboard end of the cross arm. This is accomplished by looping the center of this transverse wire around the top of the grape post, thereafter passing the opposite end of this transverse grape post wire through an opening in the outboard end of the metal cross arm thereafter wrapping it around the link which supports the longitudinal trellis wire, and thereafter returning the wire ends through the hole and twisting these ends about the body portion of the wire.

Another object of the invention is to provide such a trellis which is very easily erected with little skill, it being merely necessary to nail the base part of the cross arm to the grape post, secure its outboard end by the transverse supporting grape post wire as above described and thereafter mounting the longitudinal grape trellis wire in its supporting links as above described. In nailing the cross arm the nail can be driven solidly home, a feature of the trellis being that this nail will be pried out to a limited extent in permitting limited pivotal action between the grape post and the base of the cross arm.

Other objects and advantages of the invention will be apparent from the following description and drawings in which:

FIG. 1 is a diminutive side elevational view of an upright grape post, pair of cross arms and transverse wires of a trellis embodying the present invention.

FIG. 2 is a fragmentary side elevational view of a trellis and showing the same supporting the cane bearing fruit longitudinal trellis wire, the trunk, cane and fruit of one of the grape vines supported by the main longitudinal trellis being shown in broken lines.

FIG. 3 is a horizontal section taken generally on line 3—3 of FIG. 2.

FIG. 4 is a fragmentary vertical section taken generally on line 4—4, FIG. 3.

FIG. 5 is a fragmentary horizontal section taken generally on line 5—5, FIG. 2.

FIG. 6 is an enlarged section taken on line 6—6, FIG. 2.

The grape trellis of the present invention includes conventional wooden upright grape posts 10 which by the present invention is to be used in conjunction with an existing vineyard, have been driven into the ground in a row at a suitable distance from one another to support generally horizontal longitudinal trellis wires 11 running along one or both sides, as shown, on the line of the grape posts in horizontally spaced relation thereto. Each grape post 10 can be round, square or other form in cross section and usually has a maximum cross sectional dimension of from 3½ inches to 5 inches. The longitudinal trellis wire 11 is supported in such horizontally spaced relation to each grape post 10 by a metal cross arm indicated generally at 13 the outboard end of which is supported by a transverse grape post wire 14 anchored at the top of the grape post 10. While a conventional wooden grape post is shown the invention can be adapted to grape posts made of metal or other materials.

A feature of the invention is that the cost of the metal cross arm 13, its accessory parts, installation and life must be competitive with wooden cross arms, and to this end it is made from a flat metal blank (not shown). The sides 15a, 15b, 15c of this strip of metal are formed to provide the side walls of a channel 16a, 16b, 16c throughout the length of the strip of metal, the edges of the channel being indicated at 18a, 18b, 18c. In forming the strip of metal (not shown) into the cross arm 13, one end thereof is bent transversely to form a vertical downward extension 19 adapted to hug one side of the upright grape post 10, the body part 20 of the cross arm extending upwardly and outwardly from this side of the grape post 10 at an acute included angle of about 60° to the upright grape post, although this is subject to variations. Along the downward extension 19, the corresponding part 16a of the channel is of rounding concave form in cross section, the radial dimension of this part 16a of the channel preferably being somewhat less than the radial dimension of the round grape posts 10 to which the arm is to be applied both to provide opposite edges 18a which are widely spaced from each other and also to insure that the side of the grape post 10 is engaged by these edges 18a.

These upright edges have line contact with the side of the grape post 10 and by virtue of their wide spacing provide a broader and more stable base for the arm 13 against the side of the grape post.

Each vertical downward extension 19 is provided along its vertical center line and near its upper end with a nail hole 21 extending therethrough. A common nail 22 (which may, however, be rustproof if desired) is driven through this nail hole into the wooden upright post 10. For rapid setting up of the trellis, this nail 22 is driven home with its head 23 tight against the convex face of the vertical downward extension 19. However in use with a mechanical harvester it may be pulled out to the position shown in FIGS. 2 and 5 to provide a limited pivotal connection between the cross arm 13 and its upright post 10 as hereinafter described.

In the body part 20 of each transverse arm 13, the side walls 15b are preferably formed to be flat and at a 90° included angle to each other, this body portion thereby being of angle iron form in cross section with the channel or concave side 16b facing upwardly.

The side walls 15b, 15b diverge upwardly, this being important in providing a glancing blow against the rotating arms of the mechanical grape picker for use with which the present trellis is designed.

A feature of the invention resides in the provision of an upstanding extension 25 at the outboard end of the body 20 of the cross arm 13. This provided by forming the metal strip (not shown) from which the arm 13 is made to project upwardly of its outboard end with its concave side or channel 16c facing the upright post 10 and preferably being at about a 5° included angle to the vertical, this concave die or channel 16c forming a continuation of the upwardly opening channel 16b of the body part 20 of the cross arm 13 as best shown in FIG. 4. The line of upstanding extensions 25 project upwardly from the curtain of fruit bearing canes carried by the longitudinal trellis wire 11 and are visible to the driver seated on a tractor (not shown) propelling a mechanical grape harvesting machine so as to assist him in following the longitudinal trellis wire 11 and obtain the maximum hravest.

At the vertical center line of each cross arm 13 and at the juncture between its body part 20 and upstanding end extension 25 it is provided with a through hole 26. The transverse grape post wire 14 passes through this hole. For this purpose a single length of wire 14 is preferably looped at its center around the top of the upright post 10 to provide one complete loop 14a and the two ends of this wire are threaded through the hole 26. The ends of the wire 14 are then passed through and bent around one side of a split link 28, as indicated at 14b, following which the two ends are returned through the hole 26 and individually twisted around the stretches 14c as indicated at 14d.

The lines 28 thereby form an anchorage abutment held against the side of the cross arm 13 remote from the top of the upright post 10 and connecting the outboard end of the cross arm to its transverse grape post wire 14. In addition, however, the line of links 28 serve the important function of supporting the longitudinal trellis wire 11 which they contain.

In order to avoid the laborious job of threading this longitudinal trellis wire 11 successively through the links 28 of each cross arm 13 of a row of vines, these links are in the form of standard chain repair links each made of a single length of metal wire which is manually deformable with the use of suitable hand tools (not shown), the length of metal wire being formed into a link with its ends 29 in abutting or overlapping relation to each other. By this means the longitudinal trellis wire 11 can be payed out or laid alongside a row of grape posts 10 and the successive links 28 can have their ends 29 spread apart to receive, sidewise, a corresponding part of the longitudinal trellis wire, following which the ends 29 of the links 28 can be closed together. Any other type of split link, such as one having hinged sections, could, of course, be used.

Particularly to illustrate the function of the upstanding extensions 25 at the outboard ends of the cross arms 13, a grape vine 30 is shown in dotted lines, FIG. 2. Such vines being spaced from the grape posts 10 to facilitate cultivation. The vine 30 is shown as having its trunk 31 trained vertically and then out to the longitudinal trellis wire 11. At the trellis wire the vine is trained into fruit bearing canes 32 extending along the longitudinal trellis wire 11 and suspended as a curtain 33 therefrom. It will be seen that the upstanding outboard extensions 25 project and are visible from above this curtain.

In setting up a trellis embodying the present invention, in an existing vineyard having straight rows of upright wooden posts 10 driven into the ground, at each grape post the operator takes a cross arm 13 and places its vertical downward extension against one side of the grape post 10 at an elevation so that the cross arms 13 of the entire row are all at approximately the same distance from the ground, these arms also projecting in the same direction transversely from the row of upright posts. The operator then inserts a nail 22 through the hole 21 of the cross arm 13 into the body of the grape post 10, driving it home with sufficient force to bring its head 23 tightly against the convex face of the vertical downward extension 19 of the cross arm and to drive the opposite vertical edges 18a of this vertical downward extension into firm engagement with the side of its grape posts 10.

The operator then loops the center of a length of wire 14 over the top of the upright grape post 10 and draws the ends tight to produce the loop 14a. The ends of this wire 14 are then passed through the hole 26 through the outboard end of the cross arm 13 and are also passed through a link 28, the wire being drawn so that it stretches 14c, between the top of the upright post 10 and the outboard end of the cross arm 13 are reasonably taut. The operator then passes the two ends of the wire 14 back through the hole 26 and wraps these ends, as indicated at 14d, around the outboard ends of the stretches 14c.

The operator can then similarly fasten, as shown, a second cross arm 13 to project in the opposite direction from the opposite side of each post 10.

The operator then pays out the longitudinal grape trellis wire 11 along one side of the row of grape posts 10. Progressively he then spreads part the ends 29 of the split links 28 and inserts, sideways, the longitudinal trellis wire 11, closing up each link after such insertion. If the grape posts have a pair of transverse arms 13, a second trellis wire 11 is similarly fastened to the opposite arms 13.

As described in greater detail in my said copending application, the grape vines 30, between and in spaced relation to the posts 10, have their main trunk 31 trained upwardly and thence laterally to the longitudinal trellis wire 11. Here the grape vines are trained to form a curtain of canes growing along the trellis wire 11 and forming a fruit bearing curtain 33 depending therefrom.

The mechanical harvester forming the subject of my copending application receives this curtain and shakes the fruit therefrom and the driver of the harvester is seated at such high elevation that he can observe and steer the harvester to follow the line of upwardly projecting outboard ends 25 of the trellis to harvest the maximum amount of fruit. In the event this harvester should strike one of these ends, or the body part 20 of one of the cross arms, it will cause the cross arm to swing upwardly and fulcrum about the tops of vertical edges 18a of the base extension 19 thereby to pull out the nail 22 to the limited degree shown in FIGS. 1, 2 and 4. Thereafter, this nail permits such pivoting between the base 19 of the cross arm 13 and the upright grape post 10 but at the same time it will be noted that the wide spacing of the splayed or spread apart vertical edges 18a of this downward extension 19 provide a stable support for the cross arm, particularly against being displaced transversely horizontally lengthwise of the row of grape posts. It will also be appreciated that the very substantial weight of the fruit bearing canes on the longitudinal trellis wire 11 serves to hold each cross arm 13 in proper position.

The V-shaped cross section of both the body part 20 and upward extension 25 of each cross arm 13 is important in providing yield when struck by parts of the mechanical harvester. Thus, the extensions 25 by this cross sectional form provide cam faces which are salient away from the grape posts to permit of cam attachments on the harvester designed to protect the cross arms when contact occurs. Similarly the body parts 20 provide downwardly salient cam surfaces designed to provide a glancing blow when struck by moving parts, such as shaker arms, of the harvester.

From the foregoing, it will be seen that the present invention provides a trellis including cross arms which not only are much stronger and have a much longer life than the wooden cross arms heretofore proposed, but also is economically competitive therewith and can be erected with less time and effort and is particularly suited for use with a mechanical grape harvesting machine.

What is claimed is:

1. A trellis having a row of posts set into the ground to support a generally horizontal trellis wire arranged along at least one side of said row of posts in transversely spaced relation thereto, rigid arms the body portion of each of which has its outboard end arranged adjacent said trellis wire and its inboard end arranged at a lower elevation adjacent the opposing side of a corresponding post, and a separate flexible transverse post horizontal wire having one end fastened to the post above said inboard end of said rigid arm and having its other end arranged adjacent said outboard end of said rigid arm to provide a stretch between said post and outboard end of said rigid arm which stretch will flex to permit upward movement of said outboard end of said rigid arm, wherein the improvement comprises each of said rigid arms being formed a single, one piece metal wall with its said body portion of cross sectional form to so render the arm rigid and with its said inboard end being an integral downward vertical projection adapted to lay against said opposing side of its post and provided with a through hole leading to said opposing side of said post, a fastening member having a shank extending through said hole and anchored in said post and also having a head spaced from the outer face of said downward vertical projection in the normal operative position of said rigid arm, and means securing said trellis and flexible transverse post wires to said outboard end of said arm, the spacing of said head from the outer face of said downward vertical projection, in the machine harvesting of grapes, permitting said outboard end of said rigid arm to be reciprocated upwardly from such normal operative position for shaking the grapes from the vines and to return to such normal operative position after being so reciprocated.

2. A trellis as set forth in claim 1 wherein said post is a wooden post and said securing means is a nail.

References Cited

UNITED STATES PATENTS 3,233,853  2/1966  Majewski _____ 248—221 X

FOREIGN PATENTS 199,955  1923  Great Britain.

ABRAHAM G. STONE, *Primary Examiner.*

ROBERT E. BAGWILL, *Examiner.*